(12) United States Patent
Wyatt et al.

(10) Patent No.: US 10,656,128 B2
(45) Date of Patent: May 19, 2020

(54) SYSTEM AND METHOD FOR GAS SAMPLE ANALYSIS

(71) Applicant: MAX Analytical Technologies, Inc., East Windsor, CT (US)

(72) Inventors: Eddie Dean Wyatt, Havertown, PA (US); Peter Paul Behnke, Vernon, CT (US); Martin L. Spartz, Ellington, CT (US)

(73) Assignee: MLS ACQ, INC., East Windsor, CT (US)

( * ) Notice: Subject to any disclaimer, the term of this patent is extended or adjusted under 35 U.S.C. 154(b) by 449 days.

(21) Appl. No.: 15/488,006

(22) Filed: Apr. 14, 2017

(65) Prior Publication Data

US 2017/0299559 A1 Oct. 19, 2017

Related U.S. Application Data

(60) Provisional application No. 62/323,212, filed on Apr. 15, 2016.

(51) Int. Cl.
*G01N 30/86* (2006.01)
*G01N 30/74* (2006.01)

(52) U.S. Cl.
CPC ..... *G01N 30/8675* (2013.01); *G01N 30/8631* (2013.01); *G01N 30/8617* (2013.01); *G01N 30/8672* (2013.01); *G01N 2030/743* (2013.01)

(58) Field of Classification Search
CPC ................. G01N 30/8675; G01N 30/8631
See application file for complete search history.

(56) References Cited

U.S. PATENT DOCUMENTS

| 4,353,242 A * | 10/1982 | Harris ................ G01N 30/8624 73/23.36 |
| 9,606,088 B2 | 3/2017 | Spartz et al. |
| 2014/0274751 A1* | 9/2014 | Sadowski .......... G01N 30/8668 506/8 |
| 2016/0363569 A1* | 12/2016 | Walsh ................... G01N 30/74 |

* cited by examiner

*Primary Examiner* — Paul M. West
(74) *Attorney, Agent, or Firm* — HoustonHogle LLP

(57) ABSTRACT

A method is provided for analyzing a sample and identifying species using chromatography and spectrometry. Possible candidate species to be used in a regression analysis are selected for consideration based on their retention indices in a chromatography column and peak locations in an infrared spectrum. By using such a selection process, the number of combinations of species to be used in the regression analysis can be significantly reduced. The species and respective concentrations in the sample are identified by using an iterative process with regression analysis and minimizing least squares errors between a sample spectrum and a computed spectrum associated with selected candidate species.

18 Claims, 12 Drawing Sheets

FIG. 4

SYSTEM AND METHOD FOR GAS SAMPLE ANALYSIS

RELATED APPLICATIONS

This application claims priority to U.S. Provisional Application 62/323,212, filed on Apr. 15, 2016, entitled "Combinatorial Gas Analysis Algorithm," which is incorporated herein by this reference in its entirety.

BACKGROUND OF THE INVENTION

Gas Chromatography (GC) is used to resolve a mixture into its various components according to retention profiles of the different molecules passing through a GC column. While the technique can separate mixtures containing hundreds of substances, identifying the molecules that elute from the column is more problematic. To address the need for rapid and sensitive identification of the molecular species present, GC has been integrated with techniques such as mass spectrometry (MS) or Fourier transform infrared (FTIR) spectrometry.

Although Gas chromatography-mass spectrometry (GC-MS) technique is versatile and is employed across many different industries, it suffers from many disadvantages such as compound separation to prevent MS interferences, non-linear calibrations, poor precision and accuracy (requiring constant calibration) and limited dynamic range.

Most GC-MS systems also require user selection of a list of compounds prior to analysis (e.g., approximately 60) and then only report those. Although the MS software can then do a global search and try to identify other peaks, it can seldom perform a quantitative analysis.

Gas Chromatography-Fourier Transform Infrared Spectrometry (GC-FTIR) provides a powerful alternative as an analytical tool. For example, U.S. Pat. No. 9,606,088, to Spartz et al., entitled "Process and System for Rapid Sample Analysis" describes such a system.

SUMMARY OF THE INVENTION

Embodiments of the present invention provide a system and method for analyzing a sample using a chromatography and spectrometry system, the method includes:

(a) providing a first set of candidate species based on retention indices for the respective candidate species;

(b) selecting a subset of candidate species from the first set based on spectral information of the candidate species; and (c) providing the subset of candidate species to a combinatoric module for generating a solution that includes identities of the species in the sample and respective concentrations of the species.

In general, according to one aspect, the invention features a combinatoric module that generates the solution by performing a regression analysis and minimizing least squares errors between a computed spectrum and a sample spectrum.

In general, according to another aspect, the invention features the combinatoric module performing an iterative process by:

(d) generating a set of all possible combinations of any two species from the subset of candidate species;

(e) for each of the possible combinations of two species, generating a solution by performing regression analysis and minimizing least squares errors between a computed spectrum for the combination of two species and a sample spectrum;

(f) assigning a rating to each solution associated with each combination of two species; and (g) producing a best solution based on the ratings of the solutions for the respective combinations of two species.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4 shows two results from the regression engine, corresponding to two different gas combinations, which are displayed on a display device of the computer system.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Embodiments of the present invention relate to an analytic process implemented by software executed by a computer. The process automatically analyzes sample spectra, e.g., absorption spectra, produced by a chemical analysis system, e.g., GC-FTIR (Gas Chromatography-Fourier Transform Infrared) system, to produce a list of the most likely gases and their respective concentrations present in a sample.

Such a process can be implemented in various GC-FTIR systems, including one described by U.S. Pat. No. 9,606,088. The subject matter of this patent publication is herein incorporated by reference in its entirety.

Figure 1:
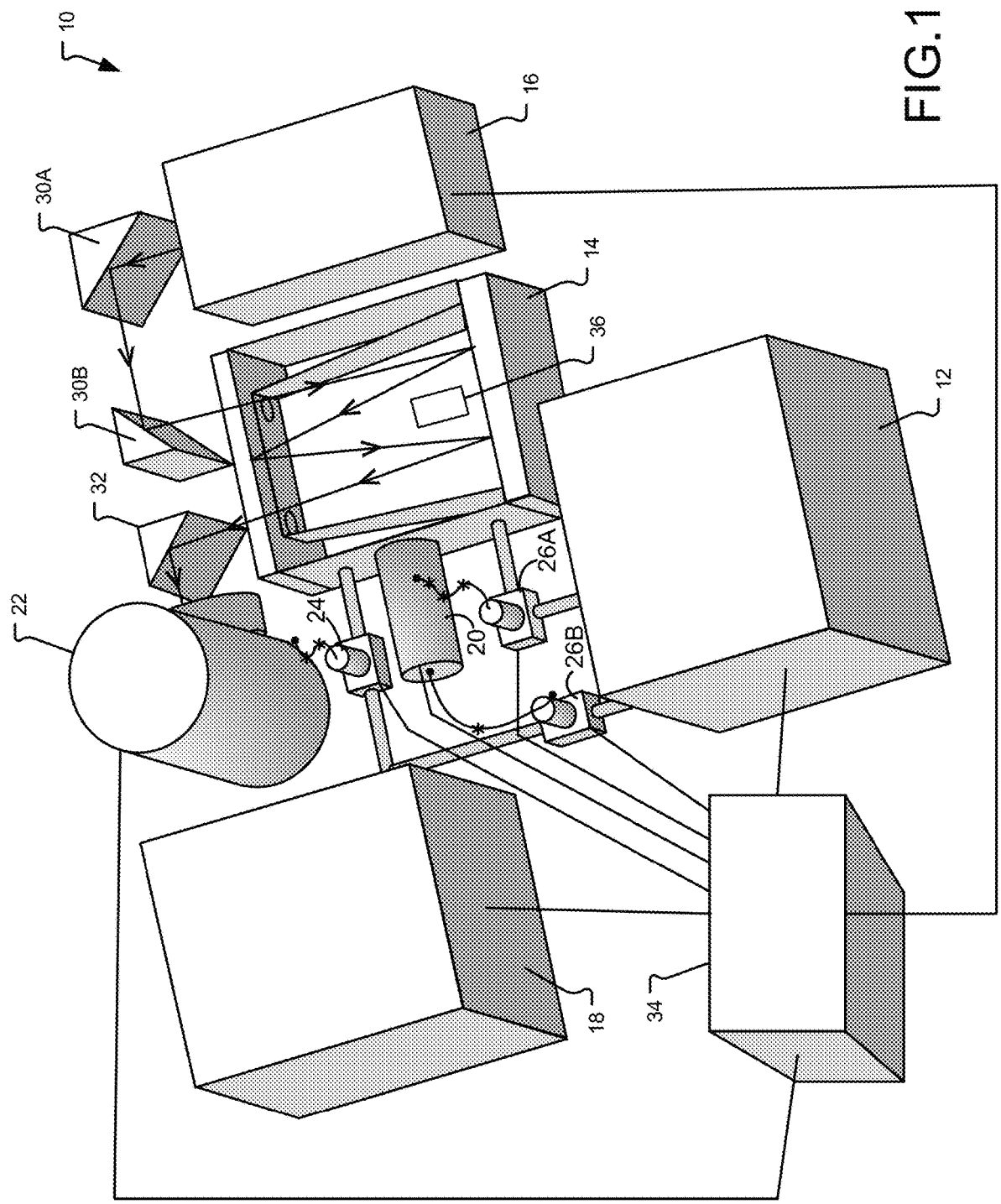
FIG. 1 is a schematic diagram of a sample analysis system, which is suitable for use with the process of the present invention.

FIG. 1 is a schematic diagram of a sample analysis system, which is suitable for use with the process of the present invention. Operation details of this sample analysis system can be found in the Spartz Patent referenced above, so only a brief description will be presented below.

The sample analysis system is designed for analyzing a sample, typically a mixture containing more than one distinct chemical species. Components in the sample can be separated through various suitable techniques, including gas chromatography or other separation methods that separate the different chemical species in time. Chemical identification of the species present in the sample is carried out by optical spectroscopy, such as FTIR. Coupling between separator and analyzer is through a sample cell having one or more features further described below.

Shown in FIG. 1, for example, is a system 10, including a separator such as gas chromatograph (GC) 12, sample cell 14, and a spectrometer, e.g., FTIR spectrometer 16, which includes a light, and more generally, an EM radiation source. In specific implementations, GC 12 and/or FTIR spectrometer 16 are commercially available instruments, with exhaust from the GC being often directly coupled to the FTIR sample cell.

In general, the GC uses a stationary phase, which is typically a microscopic layer of liquid or polymer on an inert solid glass or metal tube, i.e., a column. The mobile phase is a carrier gas, usually an inert gas such as helium or a non-reactive gas such as nitrogen. The carrier gas flow is controlled by flow controllers and/or a series of valves to maintain or vary the flow rate during the separation. The flow controllers and valves can also be used to allow the entire sample or a fraction of the sample to enter the column. The column is located in an oven where the temperature of the gas passing through the column can be controlled. The gaseous compounds interact with the walls of the column or stationary phase, causing each compound to elute at a different time, known as the retention time of the compound.

Carrier gases that can be used include nitrogen ($N_2$), for instance ultra high purity (UHP) $N_2$, or another suitable gas or gas mixture as known in the art.

Typically, output from the separator such as GC 12, is in a gaseous state, containing one or more gases and/or vapors. This output is directed to sample (also referred to as gas) cell 14.

In some examples, the cell 14 is a vessel that can be evacuated and configured to maintain a gas pressure lower than the surrounding (atmospheric or ambient) pressure. In specific implementations, the pressure in the sample cell is within the range of about 0.001 to about 1.0 atm. For instance, a flow rate of 1 mL/minute, a sample cell volume of 200 mL and a starting gas cell pressure of ½ atmosphere can provide a 100 minute time period for data acquisition. This is considered to be a sufficient time window for most GC sample analyses. The pressure in the sample cell is reduced with a vacuum pump 18, or alternative apparatus capable of drawing a vacuum. The pressure in the sample cell can be monitored with a sensor, such as an absolute pressure sensor 20.

In other examples, the cell 14 is a flow cell, such as a lightpipe, through which the output from the separator flows.

In some cases, no vacuum is required and the system can be operated at a suitable pressure. For instance, a compressor or column head pressure could be used to compress or flow the output from the GC into and possibly through the sample cell 14. Preferably, over pressurizing is avoided.

Sample cell 14 also receives electromagnetic radiation, for instance from light generated in FTIR arrangement 16 and can be designed to fit in the sample compartment of a commercial FTIR or other type of spectrometer. The cell is provided with optical components, such as windows that allow transmission of an electromagnetic radiation beam within a desired wavelength (or frequency) range.

Output radiation exits sample cell 14 and is directed by reflector 32 to detector 22, for instance a MCT (mercury cadmium telleride) device suitable for measuring the light in an FTIR. Specific examples employ liquid nitrogen cooled MCTs. One example of a suitable detector for a broad spectral analysis capability can be a 1 mm mid-band MCT with a cutoff of 16 μm.

System 10 includes electronics and computer systems. It can further include computer systems, video displays, devices, units, interfaces, data co-processors, and/or other components for data processing, analysis (including multi-variate qualitative and quantitative), recording, reporting, equipment controls, automation, flow control and controllers, pressure sensors and controllers, heaters and temperature controllers, valves and vacuum generation technology, spectral libraries, and so forth. These components are generated indicated by reference numeral 34. One or more processors, memory devices, and so on, are provided in the computer systems for executing processes of the present invention.

During operation, gas is captured in sample cell 14 for a specific time, based on the gas turnover rate in the sample cell. Various flow conditions can be employed. In a transient mode, for instance, the entire experiment (run) is conducted under a set, i.e., unchanging pressure, e.g., under a set vacuum pressure. In a full integration mode, sample cell 14 is evacuated and the sample is allowed to accumulate in the sample cell, with the pressure changing throughout the analysis. Also possible is a partial integration mode, where the sample cell is evacuated to a set pressure and a dilution gas is added and maintained in the cell for a period of time, e.g., 1 minute. Other operating modes can be employed, such as, for example, a mode that reduces the size of the data set. In other cases, a flow cell, such as a light pipe, is employed.

In some arrangements, a continuous carrier gas flow (e.g., $N_2$ or other suitable carrier gas) is directed from GC 12, into the sample cell. If desired, sample cell 14 can be closed to the $N_2$ flow from GC 12, for a given time interval. In yet other arrangements, the carrier gas, or the sample from the GC can be diverted to a secondary pumping service (not shown in FIG. 1) to prevent spectral interference from large concentration compounds such as solvent species. The flow can then be switched for sample collection. If pumping continues, the compounds that come off during this time will be standard chromatographic components (peaks) and their concentrations can be calculated as such. The peak will go up and go down as it enters and exits the sample cell so no further averaging will be done.

If sample cell 14 is initially evacuated, then sealed from pump 18, the carrier gas and sample components from the GC can accumulate in or flow through the sample cell and spectra can be obtained during the entire data collection. Since the chemicals are captured in the sample cell, the entire amount of each gas (compound) can be measured once it has completely eluted from the separation device (GC). Since the gas cell is a multiple pass gas cell in a preferred embodiment, there can be an increased absorption for each gas when compared to "light pipe" system in an optimized design. By letting all the gas remain in the gas cell, this in effect integrates the sample peak from a traditional analyzer where the sample moves past or through the detection system. This integration provides a further enhancement in SNR, which can be a factor of 2 to 5 times since the entire amount of sample is measured once it has completely eluted. Typically, this improvement is dependent on the width of the eluted peak.

In specific implementations, a control circuit managed by the computer system 34 dynamically controls the sample cell pressure. For instance, automated valves can be set to pull a vacuum on sample cell 14 before starting a run or drawing the components through a flow cell. Pressure levels in the cell can also be controlled automatically. In many cases, isolating sample cell 14 from pump 18, thus allowing gas to accumulate in the sample cell, is also performed automatically. Automation can be used to set a desired carrier gas flow from the separator, e.g., GC 12, into the sample cell, to isolate the cell from the carrier gas, to divert the carrier gas to any secondary pumping station, to switch the flow to the FTIR gas cell for sample collection, and so forth.

With respect to data handling such as data collection and analysis, a process carried out in a system such as system 10 of FIG. 1 can involve data collection; data integral, differentiation or signal averaging; data spectral deconvolution/quantification; data reporting; among others. The computer system 34 and associated components are configured for executing software for implementing embodiments of the present invention, allowing automated sample analysis using the analytic processes discussed below.

Figure 2:
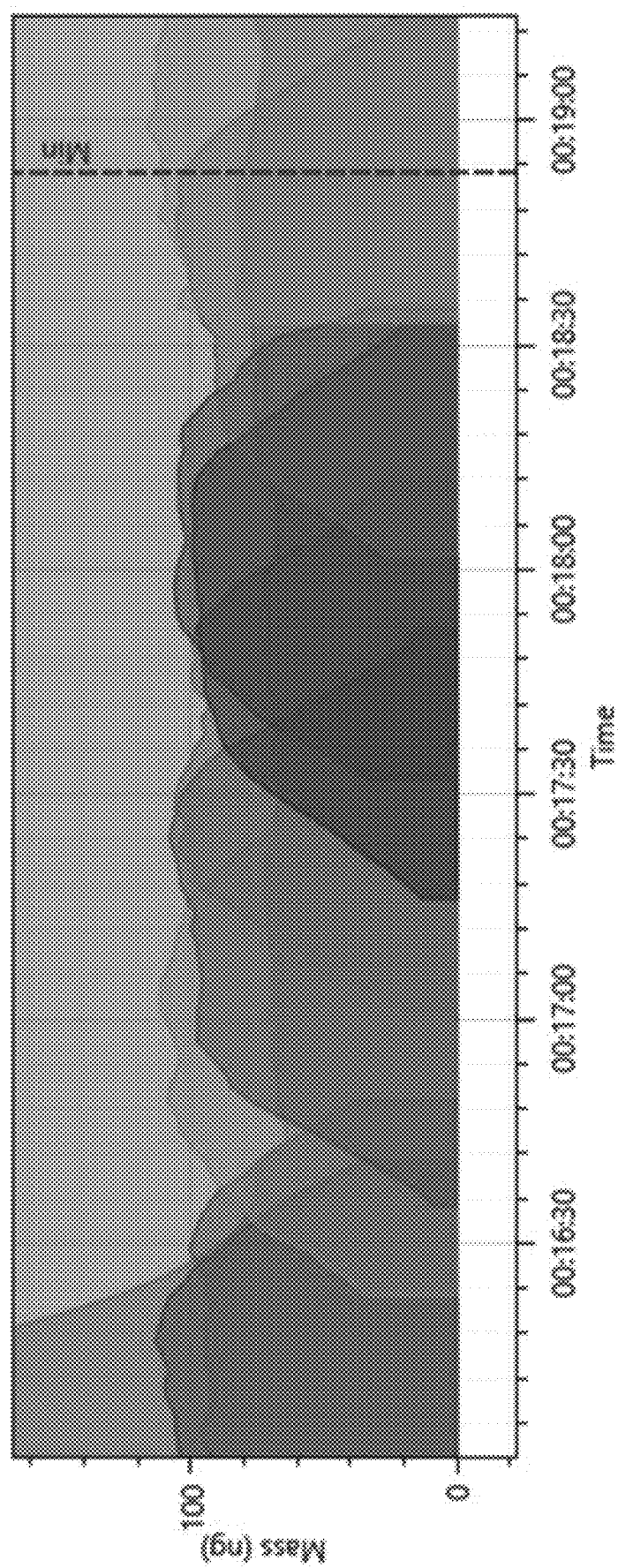
FIG. 2 is a computed plot, which is displayed on a display device of the computer system, showing amounts of different compounds eluting from a GC system as a function of time.

FIG. 2 is a computed plot which is generated and possibly displayed in a graphical user interface. The plot is generated by the computer system 34 or another computer based on data generated by the computer system 34 and possibly displayed on a display device of one of these computer systems. The plot shows the amounts of different compounds eluting from a GC system as a function of time.

The different curves in correspond to various species or components in a sample passing through or eluting from the GC column at different time periods. The goal of the analytic process of the present invention is to identify these species and their respective concentrations in the sample as a function of time. A first step in this identification process involves the computer system 34 comparing the retention indices of these species in the sample with those of known species (as a reference) in order to provide a number of plausible candidate species.

Figure 3:
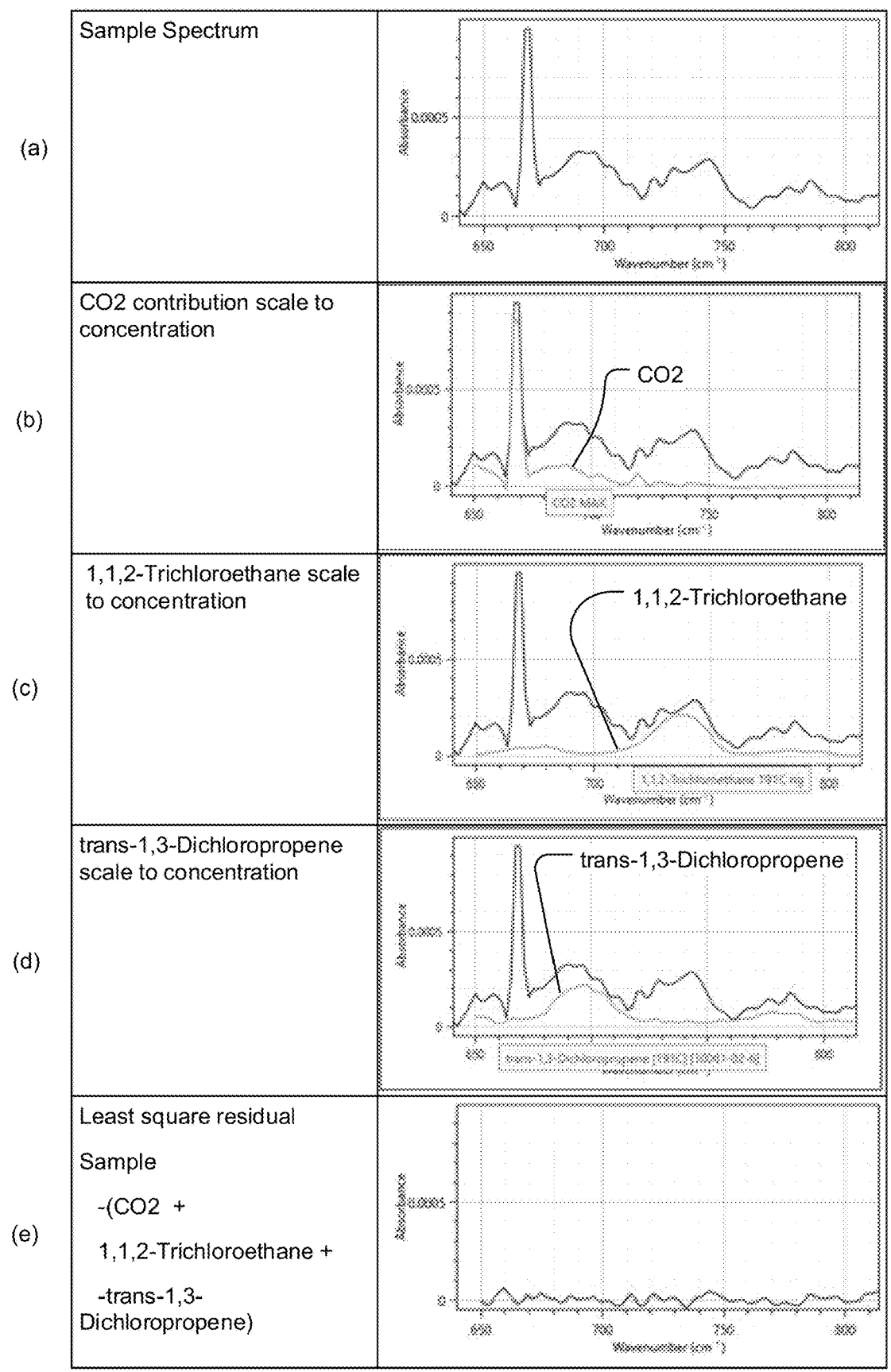
FIG. 3 illustrates the analysis of a sample IR spectrum for identifying different component gases in the sample.

FIGS. 3(*a*)-(*e*) illustrate the analysis of a sample IR spectrum for identifying different component gases in the sample that is performed by the computer system 34 or another computer based on data generated by the computer system 34 and possibly displayed on a display device of one of these computer systems.

FIG. 3(*a*) shows an IR spectrum of a sample being analyzed by the GC-FTIR system. In this example, three species, carbon dioxide, 1,1,2-trichoroethane and trans-1,3-dichloropropene, are identified as contributing to the sample spectrum, with each of their component spectrum being shown in FIGS. 3(*b*), (*c*) and (*d*), respectively. FIG. 3(*e*) shows the result of the least square residual, indicating a good match between these component contributions and the sample spectrum.

Regression and Ratings

The analytic process operates by feeding different combinations of reference gas spectra into a regression engine. This regression engine uses a least squares fit to calculate the gas concentrations for each reference spectrum needed to minimize the residual error between the sample and sum of the reference spectra scaled to their calculated concentrations.

| Regression matrix | | Prediction vector | | Sample spectrum | | Residual vector |
|---|---|---|---|---|---|---|
| $\begin{bmatrix} a1, a2, a3 \ldots an \\ b1, b2, b3 \ldots bn \\ c1, c2, c3 \ldots cn \\ \ldots \end{bmatrix}$ | × | $\begin{bmatrix} x1 \\ x2 \\ x3 \\ \vdots \end{bmatrix}$ | = | $\begin{bmatrix} y1 \\ y2 \\ y3 \\ \vdots \end{bmatrix}$ | + | $\begin{bmatrix} \varepsilon1 \\ \varepsilon2 \\ \varepsilon3 \\ \vdots \end{bmatrix}$ |

In Equation (1) above, the first term on the left hand side is a regression matrix, rows of which are the spectra of the reference gases. Specifically, one row represents a "quant" region of the gas being analyzed and quantified. The quant region is a user-defined subset of a reference spectrum that is deemed good or suitable for distinguishing and quantifying a gas. The other rows represent "interference" regions of the other reference gases, where interference regions are the spectral regions of the other gases that intersect or overlap the quant region of the gas being quanted. The rows can be arranged in any order in the matrix. Furthermore, a reference gas spectrum can include different spectra corresponding to different gas concentrations, since the spectrum of a gas can change with concentrations (e.g., relative intensities of certain peaks may be different at different concentrations).

In one embodiment, at least two regression passes or iterations are used. For example, concentration estimates for the reference gases can be generated in a first pass, in which quant gas spectrum, interference spectrum and sample spectrum are used as inputs. A second pass regression is then performed with the concentration estimates (from the first pass) as an additional input. Concentrations and other metrics can be generated by this second pass regression. In some situations, the data may undergo additional processing prior to generating the metrics and final concentrations. Such processing may be used to address issues relating to background spectrum, or to account for non-linear spectral changes as a function of gas concentrations.

The second term is a prediction vector, whose elements (x1, x2, x3 . . . ) represent the respective concentrations of the reference gases in the matrix being fitted by regression. The reference spectra are multiplied by their prediction coefficients and summed up to create a computed response vector.

On the right hand side of Eq. (1), the first term corresponds to the sample spectrum (with elements y1, y2, y3 . . . ). The second term is a residual vector representing errors between the computed response vector and the sample spectrum. These errors are to be minimized by least squares fit.

There are actually two sets of metrics computed for R2. One metric is computed at the global level over the entire spectrum. The other metric is computed over just a "quant" region. The quant region is a user-defined subset of the reference spectrum that is deemed good or suitable for distinguishing and quantifying a gas. In fact, the regression matrix above is computed only over the quant regions.

This second metric will be called the local $R^2$. There is just one global $R^2$ for the solution but each gas in the solution has its own local R-squared rating. Conceptually the global $R^2$ is measuring how well the solution fits the entire sample spectrum, while the local $R^2$ is measure how well an individual gas fits the solution.

Also note that the global rating is not a pure R-squared. It is a weighted sum of the global R-squares and the local R-squares. The weighting allows localizing fitting to play a part deciding what the best solution is.

Figure 4:
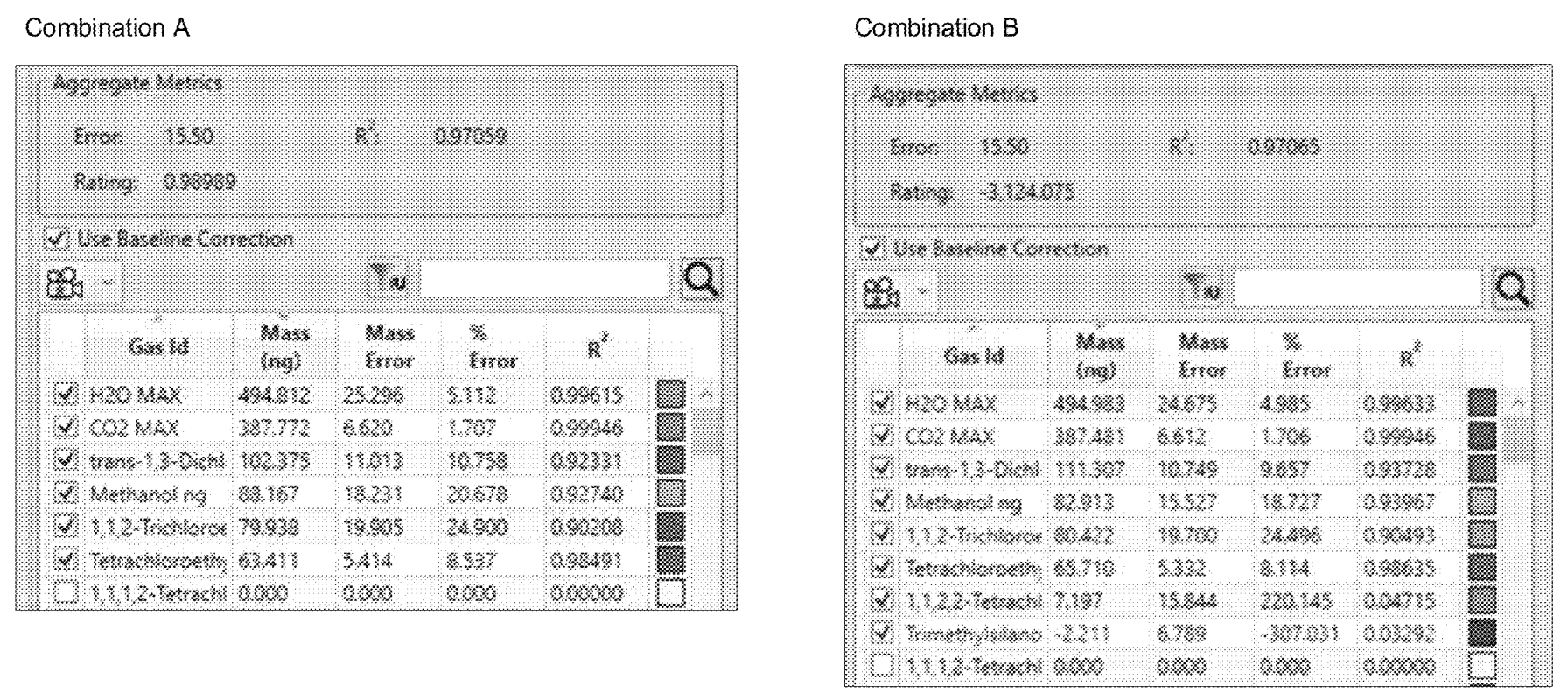

FIG. 4 is a table illustrating results from the regression engine, with two different gas combinations A and B and corresponding metrics. The illustrate table is generated and displayed in a graphical user interface by the computer system 34 or another computer based on data generated by the computer system 34 and displayed on a display device of one of these computer systems.

At the top level, two metrics: an aggregate error and R-squared (goodness of fit), are computed for the gas list (i.e., the gases in each combination) over the entire sample spectrum. Each gas in the list has similar metrics calculated based on a "regional" fit over a subset of the sample spectrum. A global or overall rating (shown in the aggregate metric section in FIG. 4 as "Rating") is created by combining these metrics into a single value.

A "combinatoric bubbler" in the analytic process then tries different combinations of gases, returning the combination that produces the highest global or overall rating. The gases to be used in different combinations are selected from a library of known gases, spectra of which are used as reference spectra for comparing with those from a sample under analysis.

In one example, 140 gases are provided in the library as reference gases. If a program were to try all possible combinations, it would require trying an astronomically high number of $1.4 \times 10^{42}$ combinations.

The formula below calculates the number of combinations, where n is the number of gases in the library.

$$\text{Combination count} = \sum_{k=0}^{n} C(n, k)$$

Since it is unrealistic to try such a large number of possible combinations, the analytic process of the present system and method are designed to reduce this number by using two different techniques—retention index filtering and peak match filtering. Details of this process are discussed below.

Figure 5:
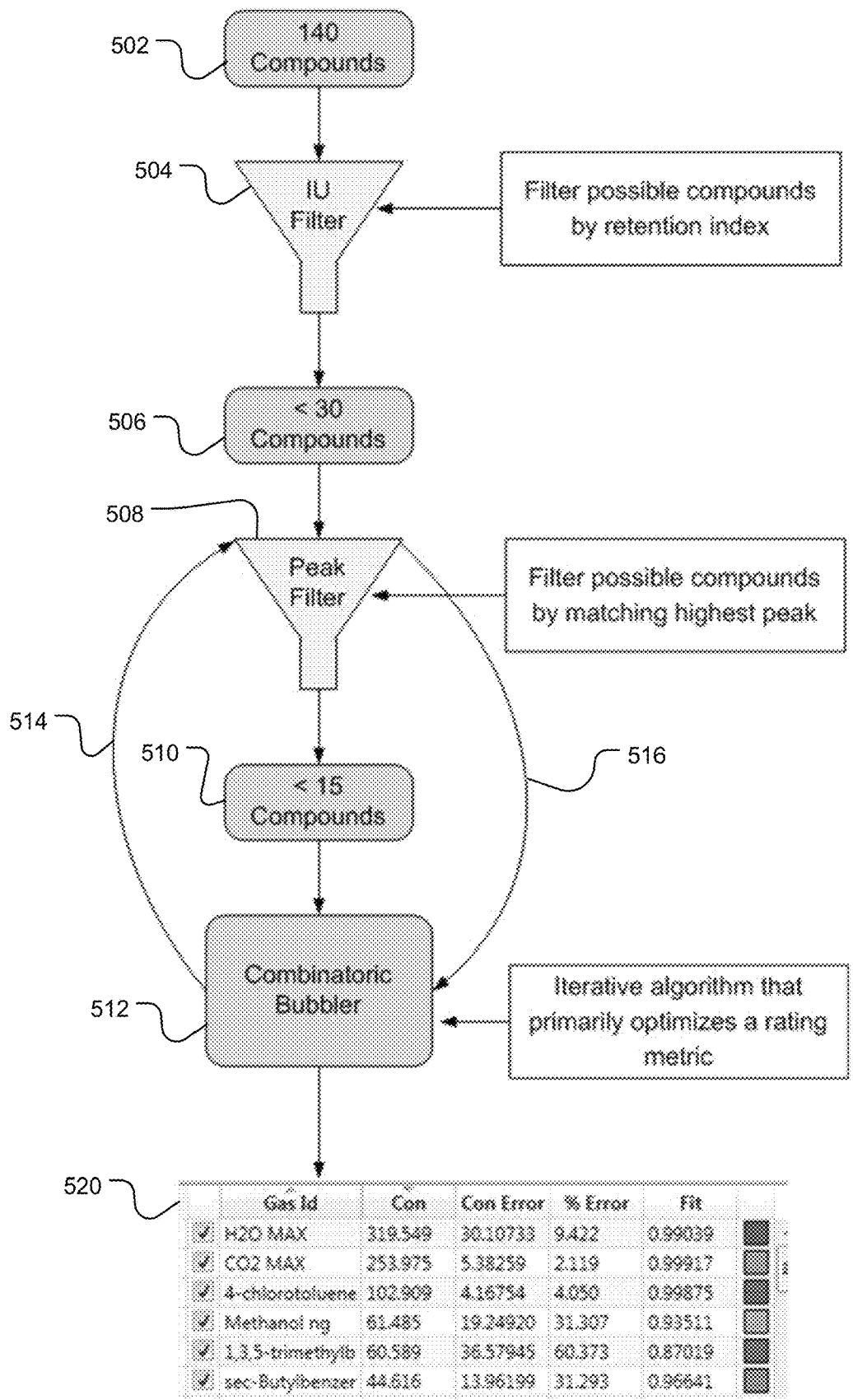
FIG. 5 illustrates some method steps for reducing the number of reference gases to be used as inputs to a combinatoric bubbler.

FIG. 5 illustrates a method 500 of sample analysis that is performed by the computer system 34 or another computer based on data generated by the computer system 34. By applying retention index filtering and peak match filtering to the library of reference gases, the method 500 can significantly reduce the number of reference gases for use in a "combinatoric bubbler" (also referred to as a combinatoric module), which uses an iterative algorithm to search for a best solution by optimizing a rating metric.

As shown in block 502, a number of references species (e.g., compounds or gases) in a library is provided to a retention index filter block 504, which filters or selects the reference species based on their retention indices.

Retention Index Filtering

Retention index filtering takes advantage of the column separator 12 on GC-FTIR analysis system of US 2015/0260695 A1, in which different gases pass through the separation column 12 at different rates. Generally lighter gases come out first, followed by heavier gases. A typical acquisition may take ½ hour to an hour to collect with most gases having an elusion window of one or two minutes. The elution window is when the gases starts and finishes exiting the column 12 into the gas chamber/sample cell 14 where it is scanned by acquiring an FTIR spectrum. By knowing when a given gas would elute, the number of possible gases that could appear for any given spectrum in the run can be greatly reduced.

In the field of chromatography, instead of directly using the retention time for compound elusion, they use retention indices. Retention index is one way to normalize the elusion time so timing is less dependent on variations in the acquisition equipment. In other words, a retention index indicates when to expect a compound to elute from a column relative to other compounds.

Hydrocarbons, C1 on up (referred to as a carbon ladder) are used to calibrated retention time to retention indexes. A carbon ladder calibration is used to convert a compound's elusion window expressed in retention indexes into actual timing in the data acquisition. With this retention index information, it becomes relatively easy to do the first pass filtering of compounds based on the retention time of the spectrum being analyzed.

Based on information of retention indices, the number of possible compounds present in a certain elution window can be selected from those in the library. As shown in block 506, this results in a number of possible compounds that is considerably smaller than those in the library. In one example, the set of possible compounds can be reduced to less than 30 out of 140 reference compounds in the library.

Peak Match Filtering

This reduced number of possible compounds is then further filtered by peak matching, as shown in block 508. By matching the strongest peak in a sample spectrum against those of reference species or compounds, the number of possible compounds to be considered for sample identification can be further reduced. In other words, the compounds or species remaining after the peak matching step is a subset of the initial or first set of species generated based on retention indices.

Peak filtering uses local maxima in a reference spectrum (i.e., spectrum for a known species in the library) to identify peaks that are then searched for in the sample spectrum. FIG. 6(a) shows peaks 601 and 602 in a reference spectrum, with a reference spectrum shown in red and a reconstructed reference spectrum in black. FIG. 6(b) shows peaks 611 and 612 in corresponding regions in a sample spectrum, with a sample spectrum shown in black and a reconstructed sample spectrum in red.

The reconstructed sample spectrum is given by:

Reconstructed Sample Spectrum=Summation (Seed Gas Spectrum*Seed Gas Concentration). This represents a computed sample spectrum that is built by summing up all of the gases currently found, with each spectrum being scaled by the respective gas concentration. Conceptually, the reconstructed sample spectrum would be what the sample spectrum should look like, if the seed gas list were the only gases present in the sample. The reconstructed sample spectrum is helpful in measuring the differences between the solution and real sample spectrum.

The reconstructed reference spectrum for a reference gas A is given by:

Reconstructed Reference Spectrum (for gas A)=Sample Spectrum−Summation (Seed Gas Spectrum*Seed Gas Concentration, with the exception of gas A). This represents a computed reference spectrum for gas A created by removing all of the gases already identified in the sample, with the exception of gas A from the sample. Conceptually, the reconstructed reference spectrum is what the reference spectrum for gas A would look like, given the actual sample spectrum and the current solution from the algorithm. The reconstructed reference spectrum is helpful in measuring how well an individual gas contributes to the overall solution.

The peak searching is done by the computer system running a regression around a small neighborhood of the reference spectrum peak (e.g., peak 601) against the corresponding region in the sample spectrum (e.g., near peak 611). Peak matching only requires one peak in the entire reference spectrum of have a good match with a corresponding peak in the sample spectrum. By good match, it means having a high goodness of fit (R-squared) value. Depending on the performance requirement, different thresholds or criteria can be used for establishing a goodness of fit. In one example, a $R^2$ value of at least 0.75 can be used.

The reason peak matching only requires one peak to match, and not most or all of the peaks, is that, in many cases, peaks in the sample may be obscured by other gases. These other gases can have peaks in the spectrum that overlap or are around the reference spectrum being tested, in which case, certain gases would not be identified by peaks filtering.

Figure 6:
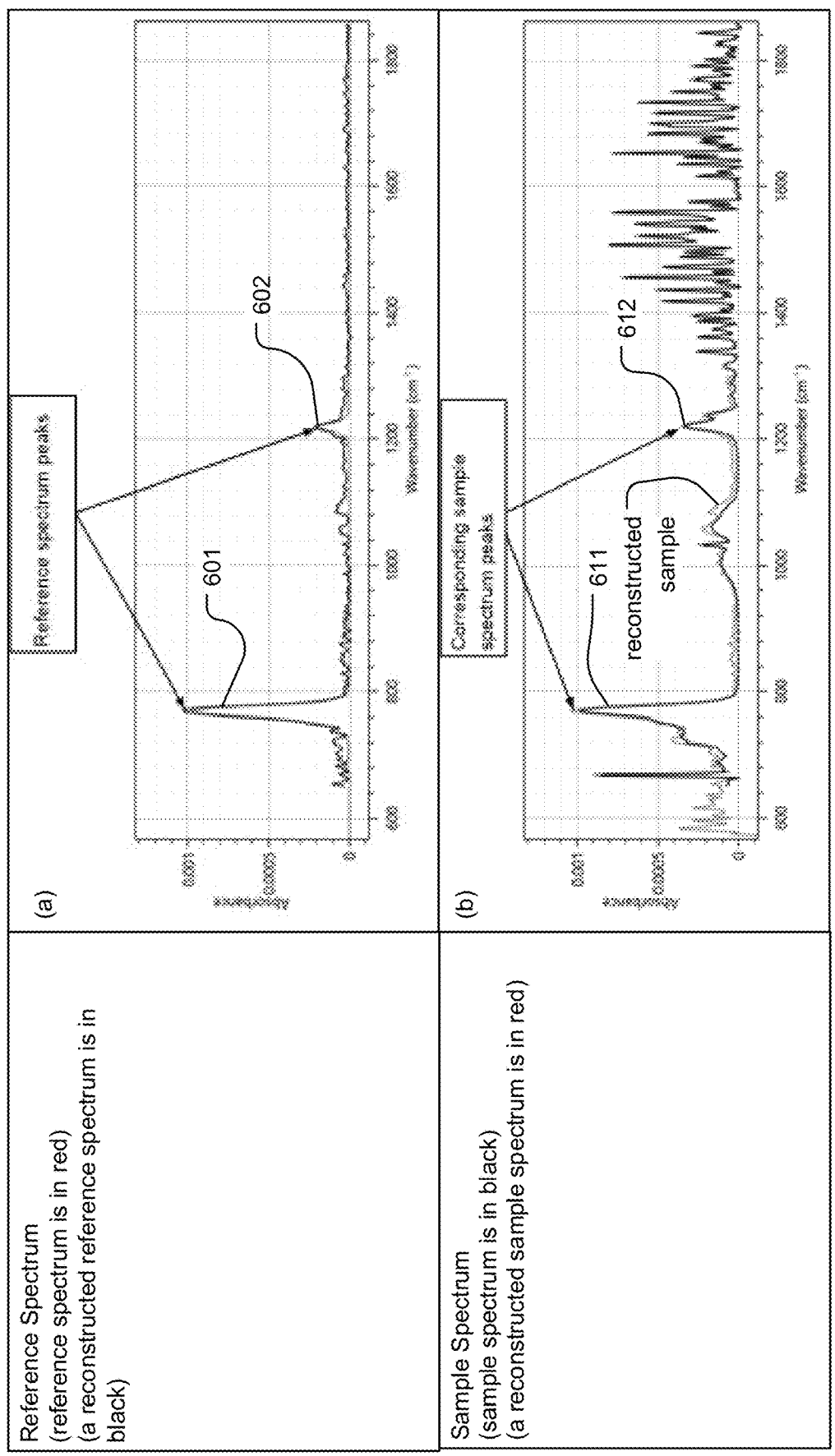
FIG. 6 illustrates the peak matching procedure, which is displayed on a display device of the computer system, in which peaks in a sample spectrum are compared to those in a reference spectrum.
Figure 7:
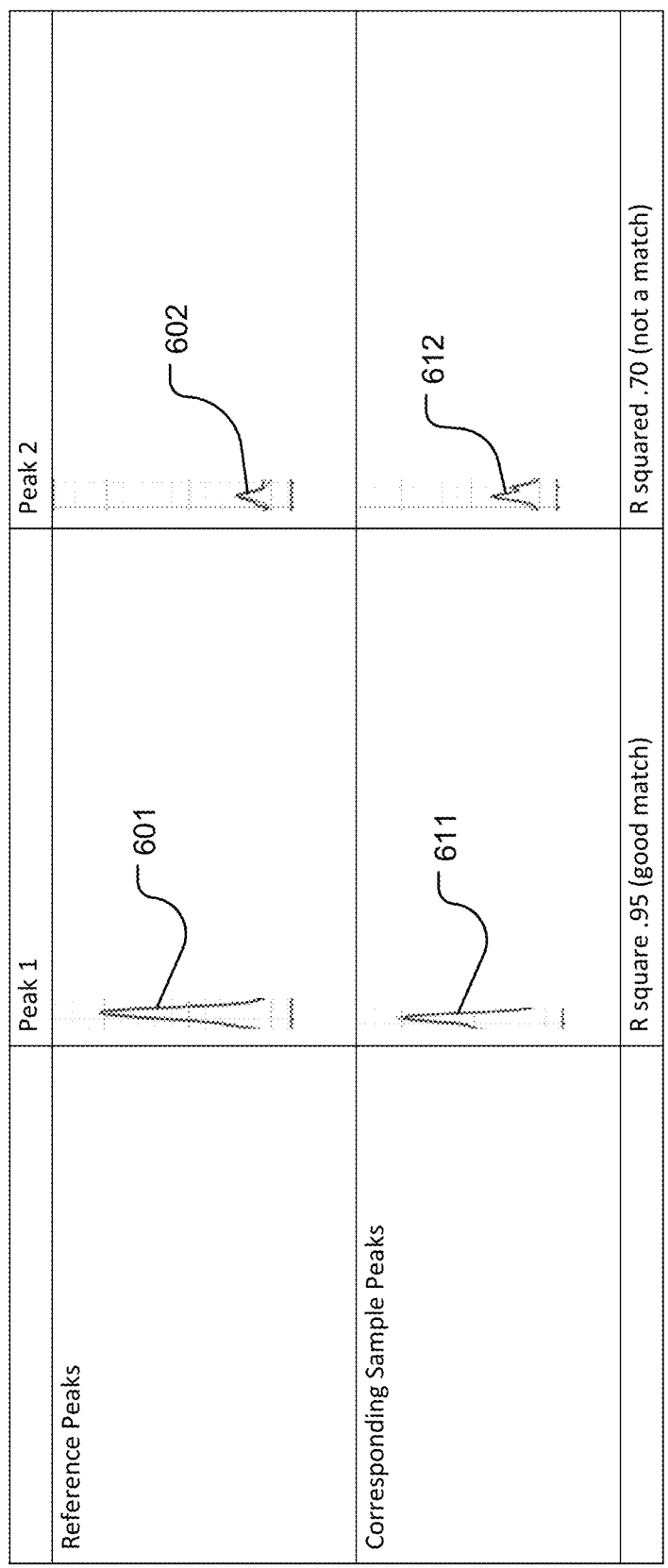
FIG. 7 illustrates the peak matching between sample peaks and those in a reference spectrum.

FIG. 7 illustrates peak matching for the peaks in the sample and reference spectra of FIG. 6 that is performed by the computer system 34 or another computer based on data generated by the computer system 34. As shown in FIG. 7, an R-square value of 0.95 is obtained for peak 601 in the reference spectrum and peak 611 in the sample spectrum, indicating a good match for these peaks. However, the match is not good between peak 612 in the sample spectrum and peak 602 in the reference spectrum, as shown by an R-square value of 0.70.

Combinatoric Bubbler

Referring back to FIG. 5, using both retention index filtering and peak match filtering, the initial list of 140 gases could most of the time be reduced to under 10 or 15 gases, as shown in block 510. However, in some situations, the number may still be as high as 20, which would result in a total number of 319,488 possible combinations. This is the number of combinations to try for just one sample spectrum in the run. An entire dataset, i.e., spectra for all species in a sample acquired over all elution windows, can consist of as many as 2000 sample spectra. Although not all spectra in a dataset will have as many combinations to try, a conventional approach, i.e., without using the combinatoric bubbler, would have to try all of these combinations for all of the spectra, which could take over hours to analyze an entire dataset.

The combinatoric bubbler is designed to improve the speed and efficiency of the analysis. Instead of trying all possible combinations, the combinatoric bubbler tries combinations with 2 species or gases at a time. After regression analysis, a solution is generated, which includes a combination of one or more gases along with their respective concentrations. Depending on the goodness of fit or rating metric, additional iterations or cycles (as shown by arrows 514 and 516 going between combinatoric bubbler 512 and peak filter 508) can be performed with one or more modified gas combinations and concentrations. The iterations can stop when a best or acceptable solution is obtained, as shown in block 520.

Figure 8:
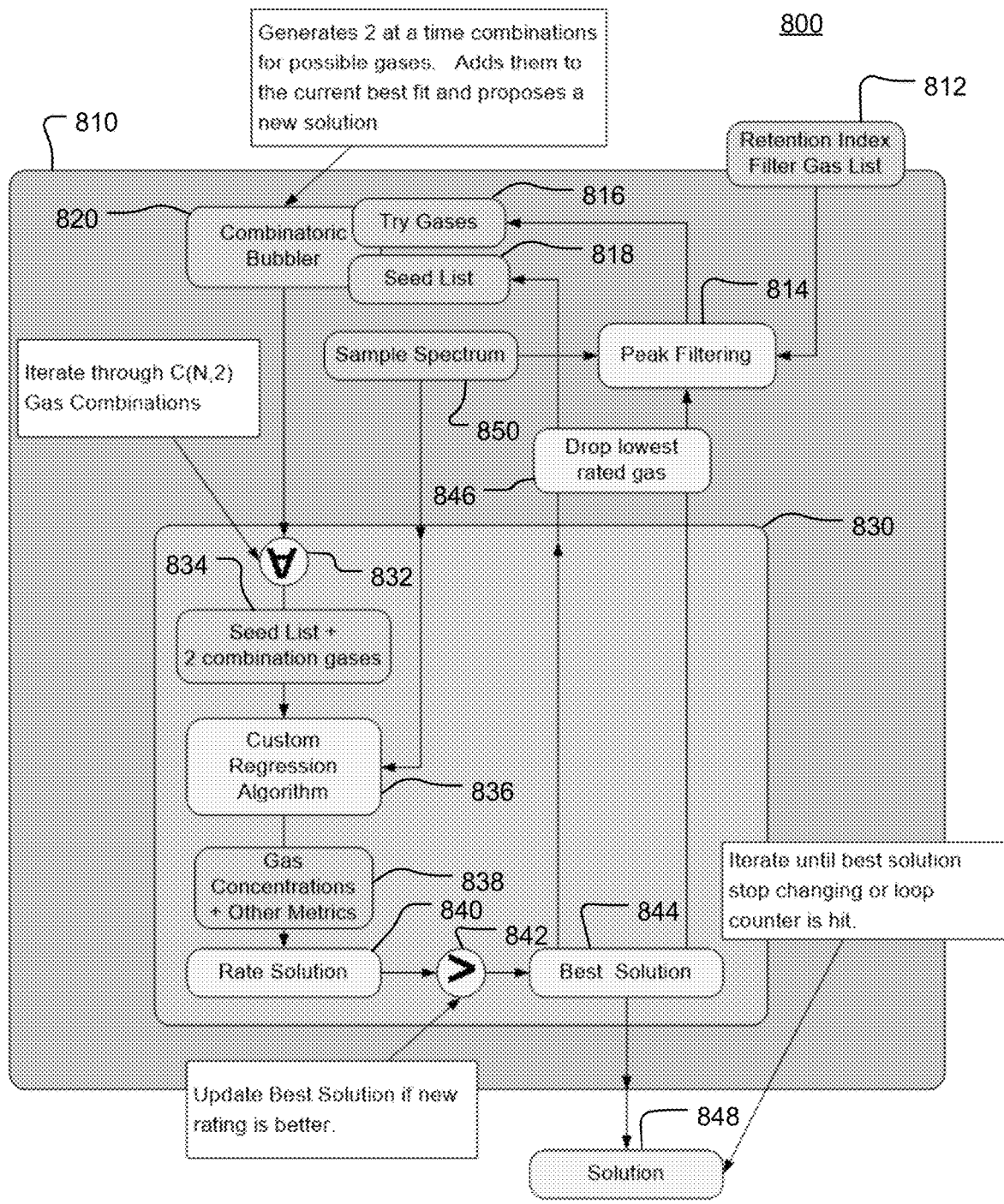
FIG. 8 illustrates method steps for obtaining a solution of sample analysis by a combinatoric bubbler.

Additional details of the various steps or operations are discussed below with reference to FIG. 8, which is a schematic representation of method 800. The method includes two portions: an outer loop 810 shown as a larger rectangle, and a combination block 830 shown as a smaller rectangle inside the outer loop 810.

Block 812 is a retention index filter gas list, which corresponds to one or more gases selected based on retention indices matching that of a sample collected from a GC column within a certain timeframe or elution window.

A spectrum 850 of the collected sample is then analyzed by peak filtering or matching in block 814, in which the sample spectrum 850 is compared with the spectra of reference gases selected based on retention index matching. Gases that satisfy the peak matching condition in block 814, i.e., gases with a good peak match in a corresponding region in the sample spectrum, are used as "try gases" or candidate gases 816 for input to the combinatoric bubbler or module 820.

For a first round of analysis, a seed list 818, which is another input to the combinatoric module 820, is an empty list. As will be explained below, the seed list will be populated in subsequent iterations in the outer loop. With the try gases and seed list as inputs, the combinatoric module 820 performs operations shown in the combination block 830.

The combination block 830 represents each generating and evaluating combination for the gases in the "try list". Each combination is rated and the best current solution selected as a part of that block.

Block 832 shows that combinations of 2 reference gases are formed from all the try gases from block 816, with N being the number of try gases, i.e., reference gases that have satisfied both the retention index and peak matching tests. Subsequent operations (blocks 834, 836, 838, 840, 842 and 844) in the combination block 830 are performed for each of these 2-gas combinations.

Block 834 shows that the seed list is combined with each of the 2-gas combinations. The spectrum for each of these new gas combinations (seed list+2-gas combinations from try gases) is analyzed by comparing with the sample spectrum 850 using a regression algorithm or engine, as shown in block 836. This regression analysis has been discussed previously in connection with Equation (1).

Block 836 shows that the regression analysis generates a solution, which includes respective concentrations of individual gases in each combination and other metrics such as error, goodness of fit ($R^2$ value), and rating.

In block 840, a rating is produced for each combination of gases. The rating primarily represents the global $R^2$ between the reconstructed reference spectrum (defined above) and the reference spectrum scaled by its computed concentration from regression. The rating of a new solution is compared with an existing best solution in block 842, and if the new solution has a higher rating, the new solution is updated as the best solution. Thus, during the first round into the combination block 830, the best solution 844 is simply the 2-gas combination having the highest rating.

However, since an initial best solution in block 844 may not be the complete solution (e.g., the sample spectrum may contain more than 2 gases), it undergoes further processing or optimization by returning to the outer loop 810. Specifically, this solution is first modified by removing the gas with the lowest local rating to form a seed list 818.

As previously mentioned, the seed list starts out empty at the beginning of the process. At the end of each iteration through the outer loop, it gets assigned best solution minus the lowest localized rated gas. Basically the seed list represents a good solution but not necessarily the best since it has a gas removed from it. In subsequent iterations, gases from the try list can be added two at a time to get an even better solution than the last best solution. The seed list is used to grow the solution from 1 gas to 2 gases to 3 gases, . . . etc., until adding gases does not improve the solution. The try list, on the other hand, represents the list of gases that can be used to grow the solution from. The try list must also be gases that have a chance of being present based on meeting retention index and peak filtering requirements in blocks 812 and 814.

The lowest local-rated gas is removed since some gases present in the sample may be obscured by other gases and hence not found in early iterations of the combinatoric bubbler. Furthermore, the best fit for any iteration may choose to falsely place a gas into the solution just because it improves the rating metric for that iteration—not because that gas is actually in the sample. Once the "real" gas or combination is identified, the false match would become a bad fit for that combination.

Thus, by removing the lowest rated gas, the algorithm has a chance to correct its earlier mistake. This removal process is how the algorithm gets its name—it bubbles "bad" intermediate results out as it iterates through different combinations.

The new seed list and try gases are processed through the combinatoric bubbler in subsequent iterations in order to improve on the best solution.

The process continues until no better solution can be found (e.g., best solution in block 844 stops changing between two iterations) or a maximum number of iterations through the combinatoric bubbler has been reached. At that stage, the best solution in 844 is considered the complete solution in block 848.

Example

To further illustrate the process in FIG. 8, an example is given as follows. Assume that there are five gases: A, B, C, D and E (try gases) in block 816, which are the gases remaining after the retention index and peak filtering blocks 812, 814.

In a first round, the combinatoric bubbler would try the following combinations of two gases each: A B, A C, A D, A E, B C, B D, B E, C D, C E and D E.

The "Seed List" starts out empty but will be added to as the outer most loop iterates. The (seed list+2 gases from the try list) become the data of the regression matrix previously presented in Equation (1).

In trying these combinations, the analytic software would keep track of the best match, for example, B E.

However, this would not be the complete solution, because the sample spectrum may contain more than 2 gases. So the combinatoric bubbler feeds this initial solution into another around of attempts as the seed list in FIG. 8. But first, it removes the gas with the lowest local rating.

Assuming B is the lowest local-rated gas, the seed list would become E. A second iteration through the combinatoric bubbler would produce the combinations:
$\underline{E}$ A B, $\underline{E}$ A C, $\underline{E}$ A D, $\underline{E}$ B C, $\underline{E}$ B D, $\underline{E}$ C D Note that even though B was the lowest rated gas and got removed in the first iteration, it never gets completely excluded from consideration, because B can come back into the try list since it may still have peaks matching the peak filter.

The localized rating for B can be improved as more and different gases are added to the best solution. In an early iteration, B may get a low localized rating because a complete set of "interference" gases were not included in its regression. An interference gas is one that shares spectral features in B's quant region. Later iterations should have a better handle on the interference gases and hence may improve the localized rating for B.

Now, E A C may be the best fit and another iteration may determine E as being the lowest rated fit. The seed list then becomes: $\underline{AC}$, with the following being the next combination set to be evaluated: $\underline{AC}$ B, $\underline{AC}$ D, $\underline{AC}$ E, . . . , and so on.

Peak Match Filtering

Figure 9:
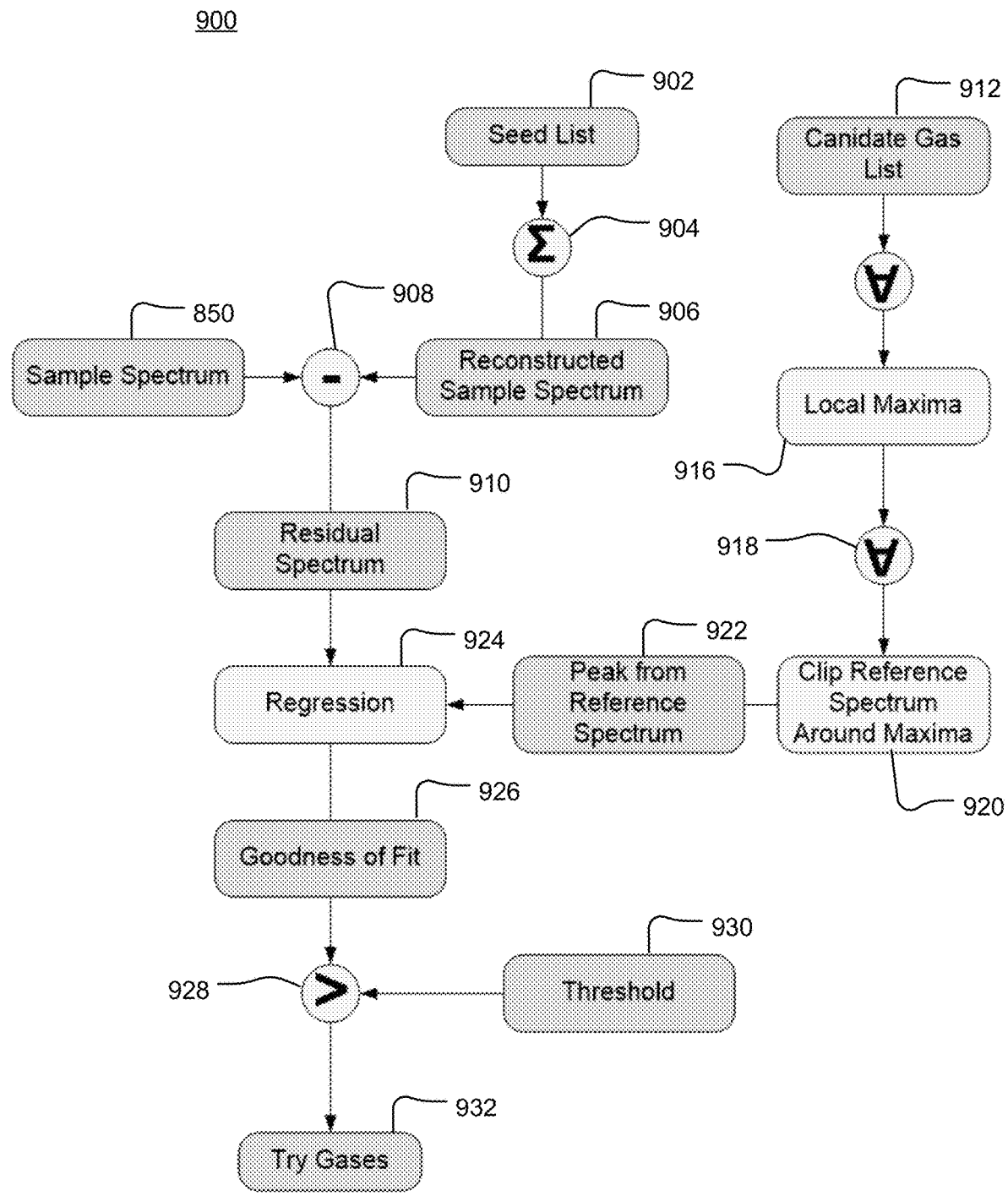
FIG. 9 shows various method steps performed during additional iterations of peak filtering.

FIG. 9 shows peak match filtering method 900 after the first iteration, with an input of a seed list 902, i.e., current best solution minus lowest rated gas from the last iteration. (The seed list is not available as an input to the peak matching filter in the first iteration.)

As mentioned earlier, gas peaks in the sample may be obscured by multiple gases sharing similar peaks (i.e., having peaks that overlap in the same spectral region). A gas can be missed if all of its peaks happen to coincide with those of other gases present in the sample.

So for each iteration through the combinatoric bubbler, the peak match filtering is re-evaluated using knowledge about what gases were currently found. The seed list 902 in peak filtering of FIG. 9 is the same seed list 818 that feeds into the combinatoric bubbler 820 in FIG. 8. It represents gases that the algorithm currently thinks are in the solution—this is not the same as the best solution.

A reconstructed sample spectrum 906 is formed by a summation of each seed gas spectrum multiplied by the corresponding seed gas concentration (i.e., a seed gas spectrum scaled to the respective seed gas concentration).

A residual spectrum 910 is then created by subtracting the reconstructed sample spectrum 906 from the actual sample spectrum 850. Conceptually, the residual spectrum is the signal left from the sample spectrum after removing the signal for those species that the algorithm currently thinks are in the sample. This residual spectrum is what still needs to be explained by other gases yet to be identified. This allows a later iteration through the peak match filtering to find gases that were completely obscured in earlier iterations.

The candidate gas list 912 is a list of gases from the library of reference gases that have passed retention index filtering. Blocks 914-915 show that, for all these candidate gases, local maxima in their spectra are located. Certain regions around the local maxima from the reference spectra are clipped to identify peaks in these reference spectra, as shown in blocks 918, 920 and 922). Regression analysis is performed in block 924 between the residual spectrum in block 910 and the peaks from reference spectra in block 922.

A goodness of fit indicator is computed in block 926 and compared in block 928 against a threshold 930. If the goodness of fit indicator satisfies a predetermined criterion, e.g., exceeds the threshold, then the gases identified in this round of peak filtering will replace the existing try gases (i.e., as a new list of try gases) in block 932, for input to the combinatoric bubbler.

Inference Rules

Figure 10:
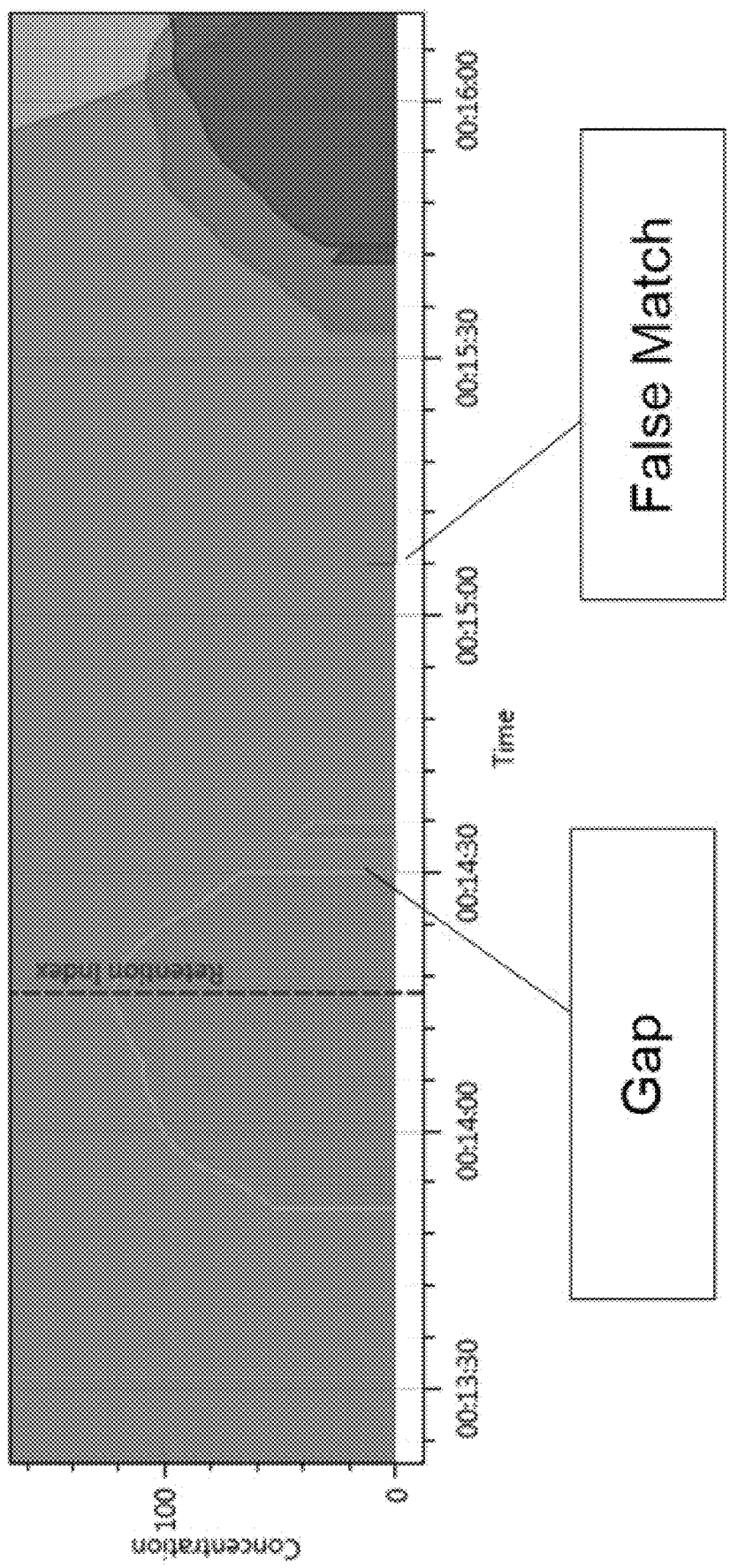
FIG. 10 shows a computed plot of compounds from a GC column, with areas of gap and false match resulting from an insufficient analysis, which is displayed on a display device of the computer system.

Since the combinatoric bubbler is not perfect, occasionally it allows false matches to pass through or skips gases for a few spectra. FIG. 10 illustrates a computed plot, showing concentrations of compounds from a GC column, with areas of gap and false match resulting from an insufficient or incomplete analysis. In practice, however, gases exiting a GC column do not just stop and restart eluting to create gaps in concentrations as a function of time. Nor would it be expected that a gas only elutes in one or two spectrum in the run. Since peak matching is run over the entire dataset, analytics of surrounding spectrum can be used to improved quality of the results.

In one embodiment, an inference rule engine is used to look at how the computed concentrations change over time and infers information about what gases should have or have not been found.

Figure 11:
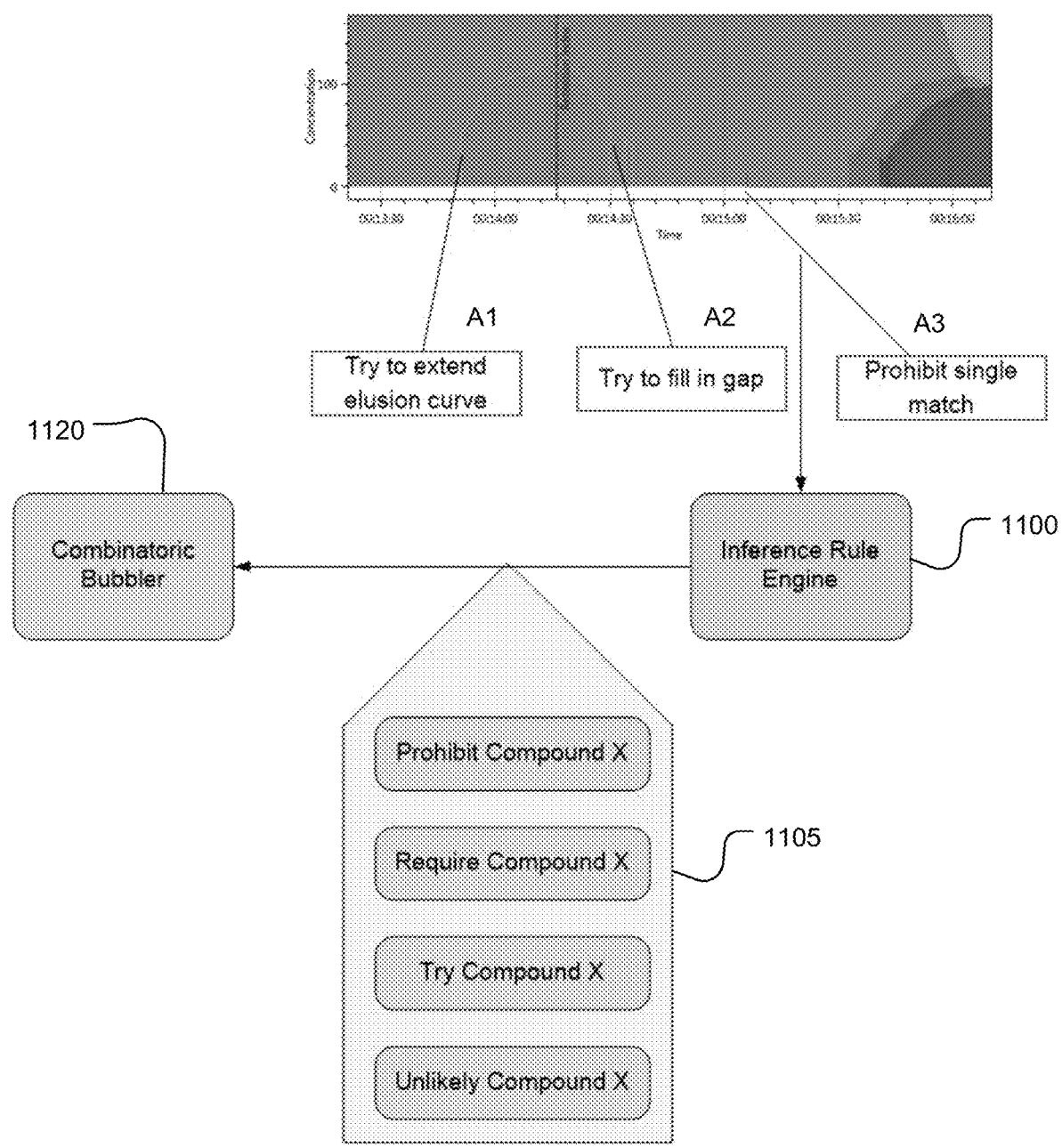
FIG. 11 shows an inference engine establishing rules for use in the combinatoric bubbler.

FIG. 11 shows an inference rule engine 1100 that is performed by the computer system 34 or another computer based on data generated by the computer system 34. It establishes rules for improving results from the combinatoric bubbler 1120. The inference rule engine 1100 identifies areas A1, A2 and A3 in the concentration plot for re-evaluation by the combinatoric bubbler. But first it creates additional rules about what it thinks may or may not be present. These rules 1105 are then provided to the combinatoric bubbler 1120. The combinatoric bubbler 1120 uses these rules by tweaking or adjusting the rating metrics of the individual gases. Gaps get inference rules that increase the rating of the missing gas, while short concentration runs get inference rules that lower the gas' rating.

Figure 12:
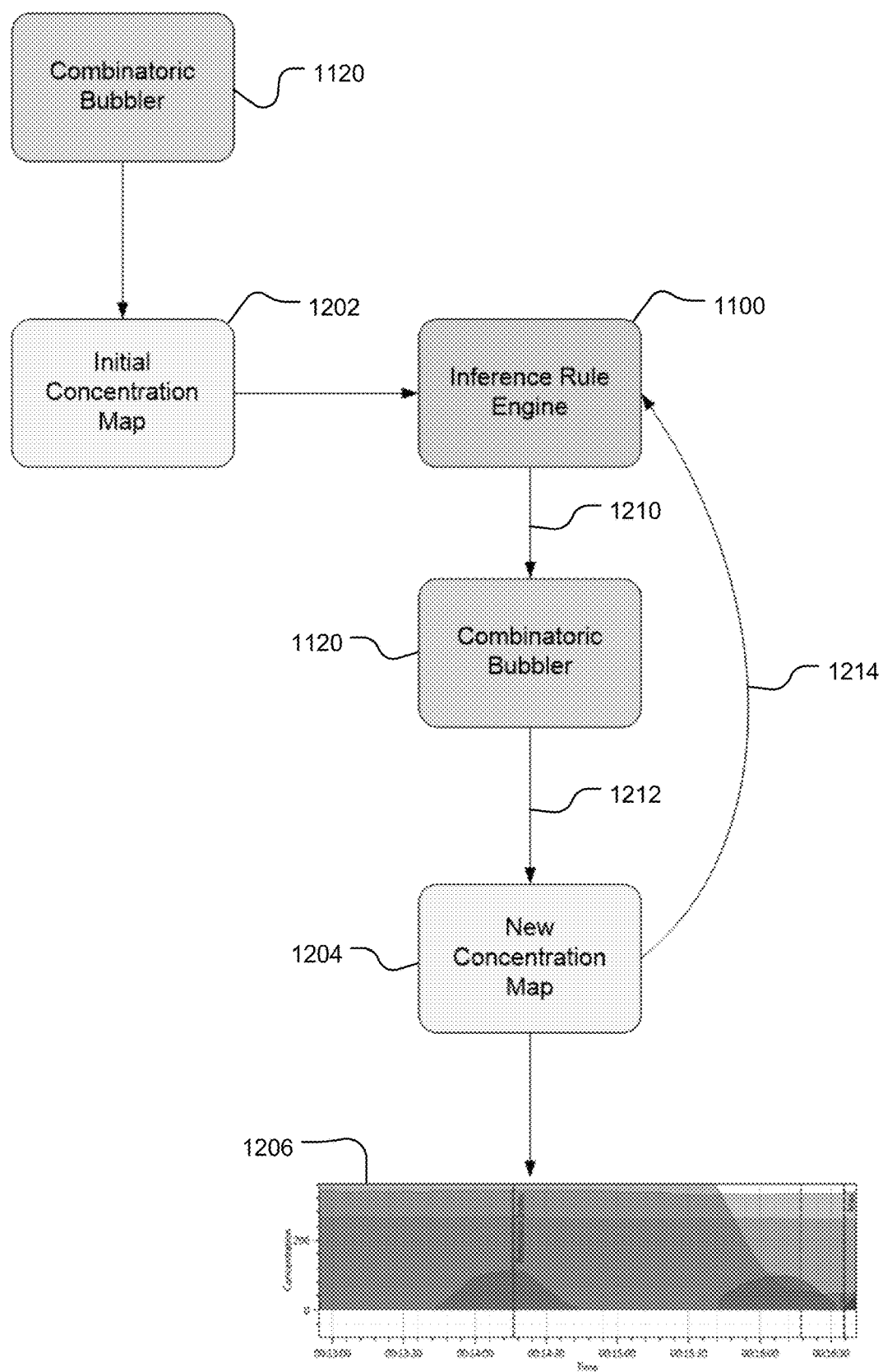
FIG. 12 shows the use of inference rule engine and combinatoric bubbler for improving the concentration map of a gas sample.

FIG. 12 is a schematic diagram showing the interactions between the inference rule engine 1100 and combinatoric bubbler 1120 for improving the concentration map of a gas sample. For example, after an initial concentration map 1202 is generated by the combinatoric bubbler 1120, it is examined by the inference rule engine 1105.

If there are areas requiring re-evaluation, the relevant information and new rules are sent to the combinatoric bubbler 1120 (see step 1210). A new concentration map 1204 is then generated in step 1212 based on the inference rules. Several cycles between the inference rule engine 1100 and the combinatoric bubbler 1120 (shown as steps 1214, 1210 and 1212) may be needed to create new inference rules and concentration maps before a satisfactory final result 1206 is obtained.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for analyzing a sample using a chromatography and spectrometry system, the method comprising:
   (a) providing a first set of candidate species based on retention indices for the respective candidate species;
   (b) selecting a subset of candidate species from the first set based on spectral information of the candidate species; and
   (c) providing the subset of candidate species to a combinatoric module for generating a solution that includes identities of the species in the sample and respective concentrations of the species, wherein the combinatoric module generates the solution by performing a regression analysis and minimizing least squares errors between a computed spectrum and a sample spectrum.

2. The method of claim 1, wherein the computed spectrum is a sum of spectra for the species identified in the solution.

3. The method of claim 1, wherein the combinatoric module performs an iterative process by:
   (d) generating a set of all possible combinations of any two species from the subset of candidate species;
   (e) for each of the possible combinations of two species, generating a solution by performing regression analysis and minimizing least squares errors between a computed spectrum for the combination of two species and a sample spectrum;
   (f) assigning a rating to each solution associated with each combination of two species; and
   (g) producing a best solution based on the ratings of the solutions for the respective combinations of two species.

4. The method of claim 3, wherein the rating in step (f) is computed from one or more metrics associated with individual combinations of two species.

5. The method of claim 3, further comprising identifying a lowest-rated species from among the species in the best solution, removing the lowest-rated species from the best solution, and performing a second iteration of regression analysis using a modified subset of candidate species.

6. The method of claim 1, wherein the retention indices are related to elution times of the species from a gas chromatography column.

7. A method for analyzing a sample using a chromatography and spectrometry system, the method comprising:
   (a) providing a first set of candidate species based on retention indices for the respective candidate species;
   (b) selecting a subset of candidate species from the first set based on spectral information of the candidate species; and
   (c) providing the subset of candidate species to a combinatoric module for generating a solution that includes identities of the species in the sample and respective concentrations of the species;
   wherein the sample is analyzed using gas chromatography and Fourier transform infrared spectrometry (GC-FTIR).

8. A method for analyzing a sample using a chromatography and spectrometry system, the method comprising:
   (a) providing a first set of candidate species based on retention indices for the respective candidate species;
   (b) selecting a subset of candidate species from the first set based on spectral information of the candidate species; and
   (c) providing the subset of candidate species to a combinatoric module for generating a solution that includes identities of the species in the sample and respective concentrations of the species;
wherein the spectral information in step (b) relates to peaks in an infrared spectrum.

9. A method for analyzing a sample using a chromatography and spectrometry system, the method comprising:
(a) providing a first set of candidate species based on retention indices for the respective candidate species;
(b) selecting a subset of candidate species from the first set based on spectral information of the candidate species; and
(c) providing the subset of candidate species to a combinatoric module for generating a solution that includes identities of the species in the sample and respective concentrations of the species;
wherein the subset of candidate species in step (b) is selected by comparing IR peaks of the candidate species with peaks in a corresponding region of an IR spectrum from the sample.

10. A system for analyzing a sample, comprising:
a separation system for providing species of a sample over time;
a spectrometry system for determining spectral information for the provided species, and
a computer system for analyzing the spectral information by providing a first set of candidate species based on retention indices for the respective candidate species for the separation system, selecting a subset of candidate species from the first set based on spectral information of the candidate species, and providing the subset of candidate species to a combinatoric module for generating a solution that includes identities of the provided species in the sample and respective concentrations of the provided species, wherein the combinatoric module generates the solution by performing a regression analysis and minimizing least squares errors between a computed spectrum and a sample spectrum.

11. The system of claim 10, wherein the computed spectrum is a sum of spectra for the species identified in the solution.

12. The system of claim 10, wherein the combinatoric module performs an iterative process by:
(d) generating a set of all possible combinations of any two species from the subset of candidate species;
(e) for each of the possible combinations of two species, generating a solution by performing regression analysis and minimizing least squares errors between a computed spectrum for the combination of two species and a sample spectrum;
(f) assigning a rating to each solution associated with each combination of two species; and
(g) producing a best solution based on the ratings of the solutions for the respective combinations of two species.

13. The system of claim 12, wherein the rating in step (f) is computed from one or more metrics associated with individual combinations of two species.

14. The system of claim 12, wherein the computer system identifies a lowest-rated species from among the species in the best solution, removing the lowest-rated species from the best solution, and performing a second iteration of regression analysis using a modified subset of candidate species.

15. The system of claim 10, wherein the retention indices are related to elution times of the species from a gas chromatography column.

16. A system for analyzing a sample, comprising:
a separation system for providing species of a sample over time;
a spectrometry system for determining spectral information for the provided species, and
a computer system for analyzing the spectral information by providing a first set of candidate species based on retention indices for the respective candidate species for the separation system, selecting a subset of candidate species from the first set based on spectral information of the candidate species, and providing the subset of candidate species to a combinatoric module for generating a solution that includes identities of the provided species in the sample and respective concentrations of the provided species,
wherein the separation system is a gas chromatography system and the spectrometry system is a Fourier transform infrared spectrometry (GC-FTIR) system.

17. A system for analyzing a sample, comprising:
a separation system for providing species of a sample over time;
a spectrometry system for determining spectral information for the provided species, and
a computer system for analyzing, the spectral information by providing a first set of candidate species based on retention indices for the respective candidate species for the separation system, selecting a subset of candidate species from the first set based on spectral information of the candidate species, and providing the subset of candidate species to a combinatoric module for generating a solution that includes identities of the provided species in the sample and respective concentrations of the provided species,
wherein the spectral information in step (h) relates to peaks in an infrared spectrum.

18. A system for analyzing a sample, comprising:
a separation system for providing species of a sample over time;
a spectrometry system for determining spectral information for the provided species, and
a computer system for analyzing the spectral information by providing a first set of candidate species based on retention indices for the respective candidate species for the separation system, selecting a subset of candidate species from the first set based on spectral information of the candidate species, and providing the subset of candidate species to a combinatoric module for generating a solution that includes identities of the provided species in the sample and respective concentrations of the provided species,
wherein the subset of candidate species in step (b) selected by comparing IR peaks of the candidate species with peaks in a corresponding region of an IR spectrum from the sample.

* * * * *